United States Patent [19]

Viets

[11] 4,074,568
[45] Feb. 21, 1978

[54] FLUIDIC OSCILLATING JET FOR HIGH FREQUENCY GUST TUNNEL

[75] Inventor: Hermann Viets, Dayton, Ohio

[73] Assignee: The United States of America as represented by the Secretary of the Air Force, Washington, D.C.

[21] Appl. No.: 684,429

[22] Filed: May 7, 1976

[51] Int. Cl.² .............................................. G01M 9/00
[52] U.S. Cl. ................................. 73/147; 239/265.23
[58] Field of Search ...................... 73/147; 239/265.23

[56] References Cited

U.S. PATENT DOCUMENTS

| | | | |
|---|---|---|---|
| 3,005,339 | 10/1961 | Loftin, Jr. | 73/147 |
| 3,036,430 | 5/1962 | Eggers et al. | 239/265.23 |
| 3,300,978 | 1/1967 | Pennington | 239/265.23 X |
| 3,749,317 | 7/1973 | Osofsky | 239/265.23 X |
| 3,819,117 | 6/1974 | Moorhead, Jr. | 239/265.23 |

FOREIGN PATENT DOCUMENTS 1,020,287   6/1955   France .............................. 239/265.23

Primary Examiner—Richard C. Queisser
Assistant Examiner—Joseph W. Roskos
Attorney, Agent, or Firm—Joseph E. Rusz; Richard J. Killoren

[57] ABSTRACT

A fluidic jet control apparatus, for use in a gust tunnel test system, having a fluidic nozzle with elongated blocks positioned adjacent the nozzle exit port. A rotating control valve is positioned in each of the elongated blocks. The rotating control valves have elongated passages therethrough. Elongated attachment plates are positioned forward of the exit port on opposite sides of the exit port. The blocks have elongated slots therein for admitting ambient pressure to the stream adjacent the exit port when the passages in the rotary valves are aligned with the slots. The rotary valve passages are rotated by a chain drive and sprocket wheels, driven by an electric motor to open the passages on opposite sides of the exit port 180 degrees out of phase. The rotary valves can be made with various configurations to provide various programmed disturbances in the wind tunnel.

7 Claims, 9 Drawing Figures

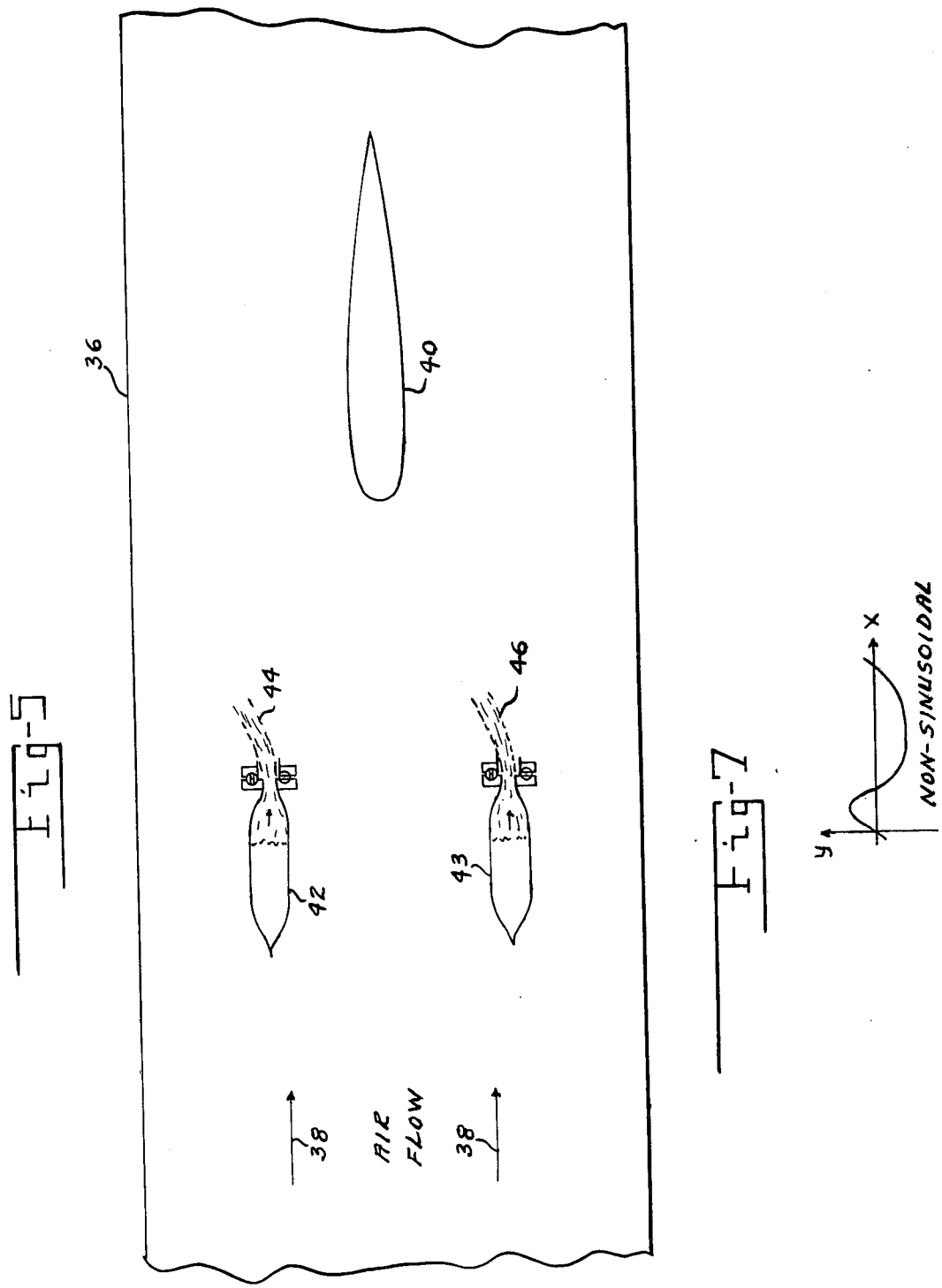

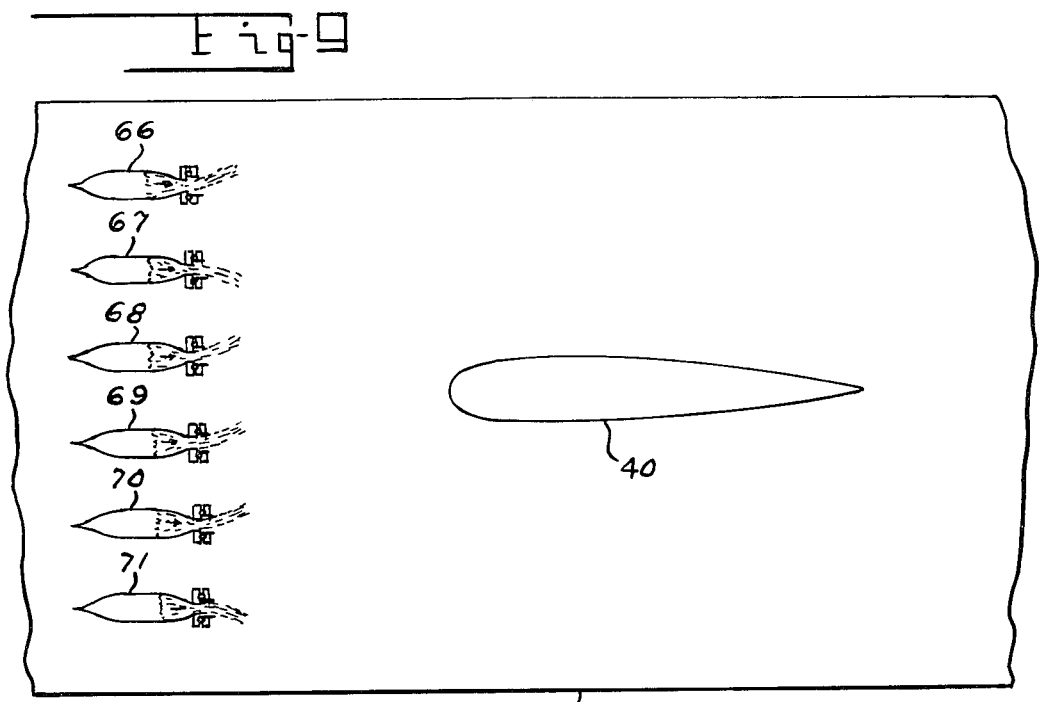
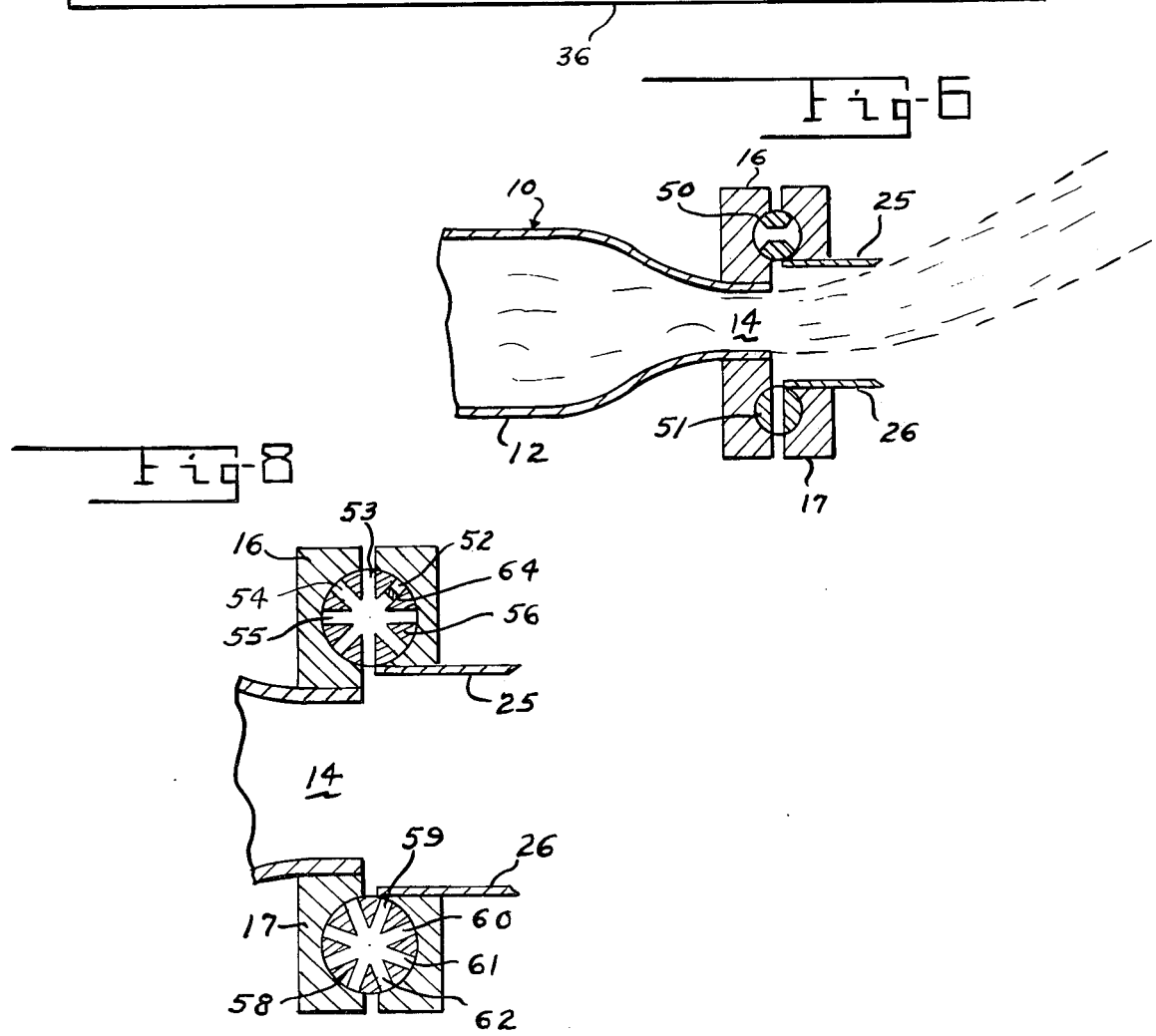

FLUIDIC OSCILLATING JET FOR HIGH FREQUENCY GUST TUNNEL

RIGHTS OF THE GOVERNMENT

The invention described herein may be manufactured and used by or for the Government of the United States for all governmental purposes without the payment of any royalty.

BACKGROUND OF THE INVENTION

The purpose of a gust response testing is to examine the effect of time dependent flow on an aircraft and, in this manner, to avoid the excitation of the structural modes by gusts and simultaneous pilot commands. These factors can result in degraded handling qualities and inadequate fatigue life. In addition, gust tunnels are employed to produce the time dependent flow to which turbomachinery components are exposed.

The majority of the techniques used to produce the time dependent flow required in gust tunnels are mechanical. One of the earlier gust tunnels consisted of two airfoils mounted in a biplane arrangement in each sidewall of the wind tunnel upstream of the test section. The airfoils were connected to a heavy flywheel and thereby driven in an oscillatory fashion in terms of angle of attack. This oscillation produced trailing vortices of alternating signs from each of the airfoils. The trailing vortices travelled downstream near the sidewalls of the tunnel and induced either an upwash or a downwash depending on the instantaneous sign. The frequency limit of the system is 20 Hz. One limitation to the tunnel is that the flow induced by the trailing vortices leads to a nonuniform transverse velocity profile across the tunnel span.

Another method of testing a model aircraft has the model passing through a single transverse gust with the model mounted on a sled traveling on a high speed track through an open jet wind tunnel directed normal to the line of travel of the model. The tunnel efflux exposes the model to a single large uniform transverse gust, which is well defined but does not allow the excitation of structural modes since it is not repeated. The model tests, as well as full scale aircraft tests, were compared to theoretical predictions.

Another attack on the problem consists of flexible test section walls on the wind tunnel. Nearly sinusoidal traveling waves are created on the top and bottom flexible walls by a system of cams and springs. Two different types of gusts, with either transverse or streamwise variations, can be produced. If the traveling waves on the top and bottom walls are in phase, the entire tunnel flow moves up and down with the walls and produces a transverse gust. If, however, the traveling waves are 180° out of phase, then the effect produced is a streamwise gust.

Another approach to gust tunnel testing involves a mechanical oscillation of the entire inlet to a small wind tunnel. A cascade is mounted in the test section and guide vanes are mounted in the inlet, which is driven by an eccentric cam. The resulting oscillatory flow produced in the test section is nominally of constant magnitude and varying direction. Therefore, this concept has great potential for the study of turbomachinery components. The primary limitations of the process appears to be the inertial problems posed by either high frequencies (requiring very high accelerations) or larger dimensions (in which case large masses must be accelerated). Current operating frequencies are on the order of 20 Hz.

A method capable of producing high frequency oscillations in a wind tunnel is described in the patent to Jacobs et al., U.S. Pat. No. 3,669,386. The basic mechanism is a fluidically controlled oscillating jet which flaps from side to side. On either side of the power jet are two control jets which are alternately cycled on and off by a remotely located servo-motor driven signal and thereby cause the power jet to attach to one side or the other. The resulting flapping jets are then installed in a wind tunnel and oscillate in phase, thereby diverting the tunnel flow in an oscillatory manner. The basic advantages of this system are its simplicity and the potential to achieve rather high frequencies.

The capability to produce high frequency gust tunnel oscillations is also desirable from the point of view of random gust work because the energy spectrum of atmospheric turbulence extends over a wide frequency range. In experimental investigations, the usual procedure is to study the response of a complex aircraft model to the gust of a preassigned frequency. From the statistical standpoint, the procedure is to investigate the model's response to random gusts of quite different frequencies. When the aircraft dynamics are assumed linear, the effect of random gusts can be synthesized by adding up the individual responses over a wide frequency range. This therefore amounts to experimentally determining the transfer function of the allegedly linear aircraft motion.

BRIEF SUMMARY OF THE INVENTION

It has been found that the use of control jets to provide oscillations are not needed. With the use of flow attachment plates extending forward of the control ports, the power jet can be made to oscillate by alternately opening opposite control ports to the ambient air around the fluidic nozzle. This makes the use of the system for supplying control air unnecessary. Also, a more uniform control across the width of a nozzle is provided.

According to this invention, the oscillation in the nozzle is controlled by two rotary valves oriented out of phase with each other. The upper valve is closed while the lower valve is open, allowing entrained ambient air to enter the lower control port. Due to the bistable condition of the jet, the flow attaches to the upper wall with what is essentially a Coanda reattachment caused by the closed control port. When the rotary valves are positioned with the lower valve closed and the upper valve open, the jet attaches to the lower wall.

Thus, the nozzles can be forced to oscillate with a specified phase relationship to each other and at a specified frequency.

The shape of the waveform produced by the oscillating jet can be very simply influenced by the design of the rotating valves. Most gust tunnel mechanisms result in a sinusoidal or near sinusoidal waveform. The rotating valves may be provided which are capable of producing a flowfield where the jet remains attached to one wall for the majority of the cycle and is only briefly attached to the other wall.

Turbine blades are sometimes exposed to a rotating stall condition where one or more of the upstream blades has stalled and this stalled location continually passes the individual blade or blades being considered in the downstream rotor or stator. This condition may be investigated in the gust tunnel described above by the introduction of a transverse disturbance into the flow.

A simple method of introducing a programmed transverse disturbance into the flowfield, has rotating valves which consist of four control slots, therefore one revolution of the valve results in eight cycles of the oscillating jet. Now if one of these slots is blocked, that control slot will not lead to a switch of the jet to the opposite wall, as it would if the slot were open. This results in a disturbance on the gross oscillating flow.

If the positions of the various control valves are properly set, the disturbance caused by a nonoscillating condition of a single nozzle can be made to travel from nozzle to nozzle across the transverse dimension of the tunnel. This could be accomplished by control ports with the position of the blocked element staggered by one cycle for each nozzle. Such a condition would appear as a disturbance similar to the rotating stall condition to the blade or set of blades mounted in the tunnel test section.

IN THE DRAWINGS

FIG. 5 shows the device of FIGS. 1 and 2 used in a wind tunnel.

FIG. 6 is a partially schematic sectional view of an oscillating nozzle according to another embodiment of the invention.

FIG. 7 is a waveform representing the non-sinusoidally oscillating jet for the device of FIG. 6.

FIG. 8 is a partially schematic sectional view of an oscillating nozzle according to a further embodiment of the invention.

FIG. 9 shows the device of FIG. 8 used in a wind tunnel.

Figure 1:
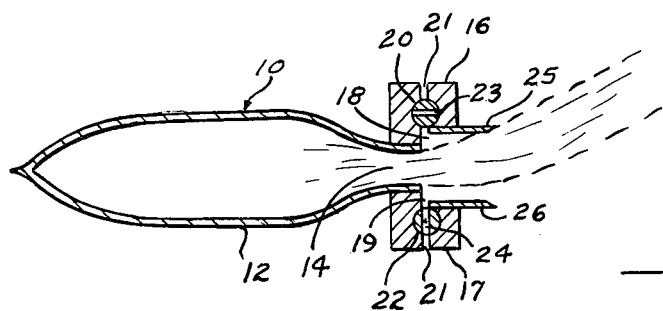
FIG. 1 is a partially schematic sectional view of an oscillating fluidic nozzle according to the invention.
Figure 2:
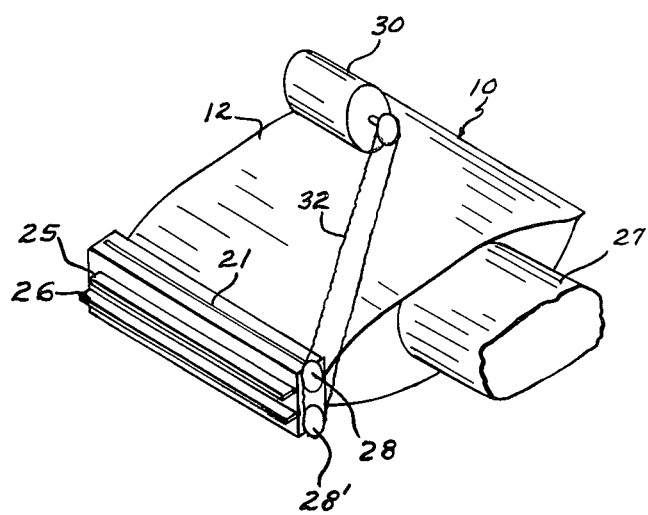
FIG. 2 is an isometric view of the device of FIG. 1.
Figure 3:
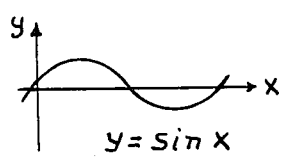
FIG. 3 is a waveform representing the sinusoidally oscillating jet for the device of FIGS. 1 and 2.
Figure 4:
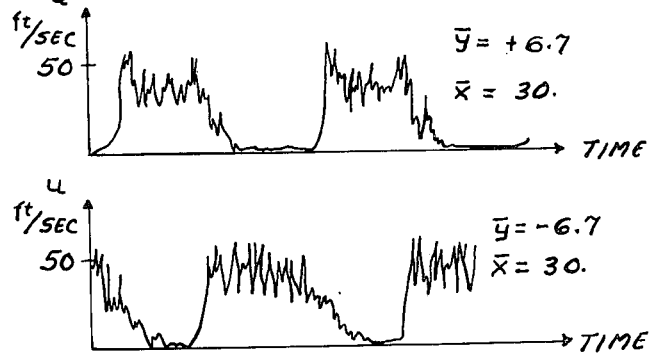
FIG. 4 shows representative waveforms of the oscillatory flow field produced by the device of FIGS. 1 and 2.

Reference is now made to FIG. 1 of the drawing which shows a fluidic oscillating nozzle 10 with a plenum 12 having an exit port 14. Blocks 16 and 17, having elongated control slots 18 and 19, are provided adjacent the exit port 14. Rotating control valves 20 and 22 are provided in the blocks 16 and 17. The rotating valves have passages 23 and 24 which can be made to register with slots 18 and 19 as well as outer slots 21. The rotary valves 20 and 22 have sprockets 28 and 28' on the end thereof which are driven by an electric motor 30 through a chain drive 32, as shown in FIG. 2. The passages 23 and 24 are positioned to operate 180 degrees out of phase with respect to each other. Flow attachment plates 25 and 26 are provided forward of control valves 20 and 22. This arrangement will provide a substantially sinusoidally oscillating stream as represented by the waveform in FIG. 3. Gas is supplied to plenum 12 through supply tube 27. The device of FIGS. 1 and 2 will provide a substantially sinusoidal output as shown in FIG. 3. The oscillatory flow field produced by a device similar to that shown in FIGS. 1 and 2 is shown in FIG. 4. These are representative of traces obtained at downstream positions at distance of 30 nozzle widths from the nozzle exit and at transverse positions of 6.7 nozzle widths above and below the centerline of the nozzle exit.

Oscillating nozzles such as shown in FIGS. 1 and 2 can be used in a wind tunnel 36 as shown in FIG. 5. With the air flow in the wind tunnel as indicated by arrows 38 and with a test model indicated at 40, the oscillating nozzles 42 and 43 can be operated in phase as shown to provide uniform transverse gusts. With the rotation of the rotary valves in nozzles 42 and 43 set to deflect the stream 44 from nozzle 42 to 180° out of phase with the stream 46 from nozzle 43, streamwise gusts will be directed toward the test model 40.

The shape of the waveform produced by the oscillating nozzles can be changed by changing the design of the rotary valve as shown in FIG. 6. By making the open angle of rotary valve 50 greater than that of valve 51, non-sinusoidally varying waves as represented by the waveform in FIG. 7 will be provided.

Turbine blades are sometimes exposed to a rotating stall condition where one or more of the upstream blades has stalled and this stalled location continually passes the individual blade or blades being considered in the downstream rotor or stator. This condition can be investigated with the device of FIG. 6 by the introduction of a transverse disturbance into the flow.

The device of FIG. 8 may be used for introducing a programmed transverse disturbance into the flow field. In this device, four passages 52, 53, 54 and 55 are provided in rotary valve 56, so that the rotation of the valves results in eight cycles of the oscillating jet. The rotary valve 58 has passages 59, 60, 61 and 62. If one of the passages, such as passage 52, is blocked with a plug 64 the control passage 52 will not result in a switch of the jet to the opposite wall. This will result in a disturbance in the gross oscillating flow.

This could be used in a device as shown in FIG. 9. If the position of the blocked passage is such that the disturbance caused by the non-oscillating condition of a single nozzle travels from nozzle to nozzle across the transverse dimension of the tunnel, a condition will appear such that the disturbance is similar to a rotating stall condition to the blade or set of blades mounted in the wind tunnel test section. Thus, if the position of the blocked passage in the nozzles 66, 67, 68, 69, 70 and 71 are angularly positioned so that the disturbance from each nozzle occurs a little later in time than the nozzle above it, the condition described above can be simulated. While the plural nozzle apparatus of FIG. 9 has been described as used in a wind tunnel, this apparatus could be used for other purposes outside of a wind tunnel.

It is to be understood that other modifications than those shown could be provided. For example, combinations of the control passages used in the device of FIG. 6 with the arrangements shown in FIGS. 8 and 9 could be used. Also more than one rotary valve can be used with each control port with the rotary valves being operated in series.

There is thus provided a high frequency gust tunnel system wherein a more uniform control of the jet is provided along the length of the nozzle and wherein the apparatus normally used to provide control air to the control ports is not needed. The device can be used to provide both transverse and streamwise gusts and can provide various types of programmed disturbances in wind tunnels.

I claim:

1. A fluidically controlled oscillating nozzle, comprising: a nozzle member having an elongated exit port; means for directing a flow of gas through said elongated exit port; a first elongated control port positioned on one side of said exit port; a second elongated control port on the side of said exit port opposite from said first control port; a first elongated flow attachment plate extending forward of said first control port in the direction of gas flow from said exit port; a second flow attachment plate extending forward of said second control port in the direction of gas flow from said exit port; means for alternately admitting ambient gas surrounding said nozzle menber to said first control port and said second control port; said means for alternately admitting ambient gas to said first control port and said second control port including a first block member including said first control port; a second block member including said second control port; said first block member having an elongated slot on a side remote from said first control port; a first elongated rotary valve member within said first block member; an elongated passage in said first rotary valve member adapted to be positioned in air flow communication with the elongated slot in the first block member and said first control port; said second block member having an elongated slot on a side remote from said second control port; a second elongated rotary member within said second block member; an elongated passage in said second rotary valve member adapted to be positioned in air flow communication with the elongated slot in said second block member and the second control port; means for rotating said first rotary valve member and second rotary valve member for registry of the passage in the first rotary valve member with the first control port and the first elongated slot out of phase with the registry of the passage in the second rotary valve member with the second control port and the second elongated slot.

2. The device as recited in claim 1 wherein said first rotary valve member has a passage which is in communication with said first control port and said first elongated slot for a greater portion of each revolution that the passage in the second rotary valve member is in communication with the second control port and the second elongated slot.

3. The device as recited in claim 1 wherein said first rotary valve member and said second rotary valve member each has a plurality of passages adapted to register out of phase with said control ports and said elongated slots; means for blocking at least one passage in one of said rotary valve members.

4. An apparatus for gust response testing of an aerodynamic test device, comprising: a gust wind tunnel having a flow of gas therethrough at a predetermined velocity with the test device positioned in the gas flow; a plurality of fluidic nozzles within said gust tunnel upstream of said test device; each of said fluidic nozzles having an elongated exit port; means for directing a flow of gas through the elongated exit port of each nozzle; a first elongated control port positioned on one side of said exit port of each nozzle; a second elongated control port on the side of said exit port opposite from said first control port of each nozzle; a first elongated flow attachment plate extending forward of said first control port in the direction of gas flow from said exit port of each nozzle; a second flow attachment plate extending forward of said second control port in the direction of gas flow from said exit port of each nozzle; means for alternately admitting ambient gas surrounding said nozzle members to said first control port and said second control port of each nozzle with a predetermined phase relation between the nozzles.

5. The device as recited in claim 4 wherein said means for alternately admitting ambient gas to said first control port and said second control port of each nozzle includes a first block member including said first control port; a second block member including said second control port; said first block member of each nozzle having an elongated slot on a side remote from said first control port; a first elongated rotary valve member within said first block members; an elongated passage in said first rotary valve member of each nozzle adapted to be positioned in air flow communication with the elongated slot in each of the first block members and said first control ports; said second block member of each nozzle having an elongated slot on a side remote from said second control port; a second elongated rotary member within said second block members; an elongated passage in said second rotary valve member of each nozzle adapted to be positioned in air flow communication with the elongated slot in each of second block member and the second control ports; means for rotating said first rotary valve member and second rotary valve member of each nozzle for registry of the passages in the first rotary valve members with the first control ports and the first elongated slots out of phase with the registry of the passages in the second rotary valve members with the second control ports and the second elongated slots.

6. The device as recited in claim 5 wherein the first rotary valve member of each nozzle has a passage which is in communication with the first control port and said first elongated slot of the corresponding nozzle for a greater portion of each revolution that the passage in the second rotary valve member of each nozzle is in communication with the second control port and the second elongated slot of the corresponding nozzle.

7. The device as recited in claim 5 wherein said first rotary valve member and said second rotary valve member of each nozzle each has a plurality of passages adapted to register out of phase with said control ports and said elongated slots of each nozzle; means for blocking at least one passage in one of said rotary valve members of each nozzle, with the oscillations in each of said fluidic nozzles having a predetermined phase relation with respect to the other nozzles in the gust wind tunnel.

* * * * *